United States Patent
Wu et al.

(10) Patent No.: US 10,325,618 B1
(45) Date of Patent: Jun. 18, 2019

(54) PERPENDICULAR MAGNETIC RECORDING (PMR) WRITER WITH ONE OR MORE SPIN FLIPPING ELEMENTS IN THE GAP

(71) Applicant: Headway Technologies, Inc., Milpitas, CA (US)

(72) Inventors: Yan Wu, Cupertino, CA (US); Yuhui Tang, Milpitas, CA (US); Wenyu Chen, San Jose, CA (US); Ying Liu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/037,197

(22) Filed: Jul. 17, 2018

(51) Int. Cl.
*G11B 5/11* (2006.01)
*G11B 5/127* (2006.01)

(52) U.S. Cl.
CPC .............. *G11B 5/11* (2013.01); *G11B 5/1278* (2013.01)

(58) Field of Classification Search
CPC ................................ G11B 5/11; G11B 5/1278
USPC .................. 360/125.1–125.5, 125.31–125.35
See application file for complete search history.

(56) References Cited

U.S. PATENT DOCUMENTS

| | | | |
|---|---|---|---|
| 6,809,899 B1 | 10/2004 | Chen et al. | |
| 6,954,340 B2 | 10/2005 | Shukh et al. | |
| 7,009,812 B2 | 3/2006 | Hsu et al. | |
| 7,724,469 B2 | 5/2010 | Gao et al. | |
| 7,835,111 B2 | 11/2010 | Flint et al. | |
| 7,957,098 B2 | 6/2011 | Yamada et al. | |
| 7,963,024 B2 | 6/2011 | Neuhaus | |
| 7,982,996 B2 | 7/2011 | Smith et al. | |
| 8,027,110 B1 | 9/2011 | Yamanaka et al. | |
| 8,064,244 B2 | 11/2011 | Zhang et al. | |
| 8,068,312 B2 | 11/2011 | Jiang et al. | |
| 8,154,825 B2 | 4/2012 | Takashita et al. | |
| 8,264,792 B2 | 9/2012 | Bai et al. | |

(Continued)

FOREIGN PATENT DOCUMENTS

| | | |
|---|---|---|
| JP | 2002-13610 | 5/2002 |
| JP | 2002-298309 | 10/2002 |

(Continued)

OTHER PUBLICATIONS

PTO Office Action, U.S. Appl. No. 12/964,202, Applicant: Sasaki et al., Notification date: Nov. 28, 2012, 11 pages.

(Continued)

*Primary Examiner* — Allen T Cao
(74) *Attorney, Agent, or Firm* — Saile Ackerman LLC; Stephen B. Ackerman (57) ABSTRACT

A perpendicular magnetic recording writer has a main pole (MP) with a write gap formed between the MP trailing side and a trailing shield, a side gap between each MP side and a side shield, and a leading gap between the MP leading side and a leading shield. A flux guiding element is formed in at least one gap and comprises an inner non-spin preserving layer adjoining the MP, a middle flux guiding layer (FGL), and an outer spin preserving layer. A key feature is that the FGL has a magnetization that may be aligned anti-parallel to a gap field during a write process when a current of sufficient magnitude is applied from the adjacent shield towards the MP thereby increasing reluctance in the gap and forcing additional flux out of the MP at the air bearing surface to enhance writability on a magnetic recording medium.

23 Claims, 11 Drawing Sheets

(56) References Cited

U.S. PATENT DOCUMENTS

| | | |
|---|---|---|
| 8,295,008 B1 | 10/2012 | Sasaki et al. |
| 8,310,787 B1 | 11/2012 | Sasaki et al. |
| 8,427,781 B1 | 4/2013 | Sasaki et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,299,367 B1 | 3/2016 | Tang et al. |
| 9,361,912 B1 * | 6/2016 | Liu ................ G11B 5/187 |
| 9,406,317 B1 | 8/2016 | Tang et al. |
| 9,466,319 B1 | 10/2016 | Tang et al. |
| 9,824,701 B2 | 11/2017 | Tang et al. |
| 10,014,021 B1 * | 7/2018 | Liu ................ G11B 5/1278 |
| 10,032,469 B2 | 7/2018 | Lim et al. |
| 2002/0034043 A1 | 3/2002 | Okada et al. |
| 2004/0150910 A1 | 8/2004 | Okada et al. |
| 2005/0128637 A1 | 6/2005 | Johnston et al. |
| 2005/0141137 A1 | 6/2005 | Okada et al. |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2008/0151436 A1 * | 6/2008 | Sato ................ B82Y 10/00 360/313 |
| 2009/0059426 A1 | 3/2009 | Sasaki et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2011/0211271 A1 | 9/2011 | Ng et al. |
| 2014/0071562 A1 | 3/2014 | Chen et al. |
| 2014/0177092 A1 | 6/2014 | Katada et al. |
| 2015/0043106 A1 | 2/2015 | Yamada et al. |
| 2017/0133044 A1 | 5/2017 | Lim et al. |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

* cited by examiner

(12)  United States Patent   US 10,325,618 B1

PERPENDICULAR MAGNETIC RECORDING (PMR) WRITER WITH ONE OR MORE SPIN FLIPPING ELEMENTS IN THE GAP

RELATED PATENT APPLICATIONS

This application is related to the following: U.S. Pat. Nos. 8,582,240, 8,749,919, 9,406,317, and U.S. Patent application 2017/0133044; assigned to a common assignee and herein incorporated by reference in their entirety.

TECHNICAL FIELD

The present disclosure relates to a design for a perpendicular magnetic recording (PMR) writer wherein a magnetic layer is inserted in one or more of the write gap, side gaps, and leading gap around a main pole (MP), and has a magnetic moment that flips to an opposite direction when a current of sufficient magnitude is applied during a write process thereby increasing the reluctance in one or more of the gaps and forcing additional flux out of the MP tip at the air bearing surface (ABS) to enhance the write field on the magnetic recording medium.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. One approach that is currently being investigated is microwave assisted magnetic recording (MAMR), which is described by J-G. Zhu et al. in "Microwave Assisted Magnetic Recording", IEEE Trans. Magn., vol. 44, pp. 125-131 (2008). Although MAMR has been in development for a number of years, it is not shown enough promise to be introduced into any products yet. In particular, a difficult challenge is to find a spin torque oscillator (STO) film that is thin enough to fit into the small write gap required for state of the art products while providing a high magnetic moment in the oscillation layer to generate a sufficient radio-frequency field for the assist effect.

Spin transfer (spin torque) devices are based on a spin-transfer effect that arises from the spin dependent electron transport properties of ferromagnetic-non-magnetic spacer-ferromagnetic multilayers. When a spin-polarized current passes through a magnetic multilayer in a CPP (current perpendicular to plane) configuration, the magnetic moment of electrons incident on a ferromagnetic layer interacts with magnetic moments of the ferromagnetic layer near the interface between the ferromagnetic and non-magnetic spacer. Through this interaction, the electrons transfer a portion of their angular momentum to the ferromagnetic layer. As a result, spin-polarized current can switch the magnetization direction of the ferromagnetic layer if the current density is sufficiently high.

In a PMR writer, the main pole generates a large local magnetic field to change the magnetization direction of the medium in proximity to the writer. By switching the direction of the field using a switching current that drives the writer, one can write a plurality of media bits on a magnetic recording medium. Magnetic flux in the main pole proceeds through the ABS and into a medium bit layer and soft underlayer (SUL). In some common designs, the flux returns to the write head through a trailing side loop comprised of a trailing shield structure, and through a leading side loop that includes a leading shield and back gap connection. There is also a gap field that exits the main pole through the write gap, side gaps, and leading gap, and is not directly responsible for writing. Therefore, an improved gap design surrounding the main pole is desirable where the gap field is minimized during a write process and thereby forces a greater portion of magnetic flux to exit the main pole tip at the ABS for enhanced writability. This enhanced magnetic field does not necessarily need to coexist with a microwave assisted recording effect.

SUMMARY

One objective of the present disclosure is to provide a flux guiding element that increases the reluctance in one or more gaps between the MP tip and surrounding shield structure including a trailing shield, side shields, and leading shield thereby forcing more magnetic flux through the MP tip at the ABS and into a magnetic recording medium during a write process.

A second objective of the present disclosure is to provide a method of forming a flux guiding element according to the first objective.

According to one embodiment of the present disclosure, these objectives are achieved with a gap magnetic layer (GML) stack that is formed in at least one gap between a main pole tip at the ABS and an all around shield structure comprised of a trailing shield formed on the write gap, a side shield adjoining each side gap, and a leading shield below the leading gap. The GML stack has an inner non-spin preserving conductor layer, a middle flux guiding layer (FGL), and an outer spin preserving conductor layer where an "outer" layer is defined as a layer formed a greater distance from the MP tip than an "inner" layer. A key feature is that the middle FGL has a magnetization aligned in the direction of the gap field when a first current ($I_a$) is applied in a direction opposite to the gap field, and oscillates (precesses) when a critical current ($I_c$) is reached where $I_c > I_a$. When the current magnitude increases to $I_b$ (where $I_b > I_c$), then FGL magnetization flips to an opposite direction with a precession cone that may be proximate to 0 degrees. Accordingly, there is more reluctance in the gap, which drives more magnetic flux from the MP tip to the ABS and into a magnetic medium for improved writability. The effectiveness of the GML stack is not limited to a particular trailing shield, side shield, or leading shield design.

In one embodiment, the GML stack is formed only on the MP trailing side and has a width essentially equivalent to the track width. Thus, a non-spin preserving layer, the FGL, and a spin preserving layer are sequentially formed on the MP trailing side and within a write gap when $I_a$, $I_b$, or $I_c$ flow from the trailing shield to the main pole. Alternatively, in a PMR writer scheme where the direction of the current is reversed, the GML stack is inverted so the spin preserving layer contacts the MP trailing side. Preferably, the GML stack has a thickness from 5 nm to 30 nm that is equal to the desired gap thickness, and the FGL has a magnetization saturation (Ms) value from 4 kiloGauss (kG) to 24 kG. The non-spin preserving layer may be Ta, W, Pt, Ru, Ti, Ir, Rh, or Pd while the FGL is preferably a magnetic multilayer comprised of $Ni_xFe_{100-x}$, $Co_yFe_{100-y}$, $Co_zNi_{100-z}$, or alloys thereof with a thickness from 4 to 30 nm, and where x, y, and z are from 0 to 100 atomic %. The spin preserving layer is one of Cu, Ag, Au, Cr, and Al.

According to a second embodiment, there is a GML stack in each side gap and optionally a GML stack in the write gap. In the GML stack adjoining each MP side, each layer is preferably conformal to an inner side of the adjacent side shield, and extends from a top end at a first plane that includes the MP trailing side at the ABS to a bottom end at a second plane that includes the MP leading side. Thus, the entire side gap is replaced with a GML stack. The spin preserving layer adjoins the side shield when $I_a$, $I_b$, or $I_c$ flow from the side shield in a direction substantially orthogonal to the MP side.

In a third embodiment, the GMR stacks formed in each side gap in the second embodiment are extended downward to replace a substantial portion of the leading gap, and end on a top surface of the leading shield. The present disclosure also anticipates a fourth embodiment where the GML stacks in the side gaps also occupy the entire leading gap.

According to a fifth embodiment, the fourth embodiment is modified to include a GML stack in the leading gap wherein each of the GML layers is formed parallel to the leading shield top surface rather than parallel to the adjacent side shield inner surface. The spin preserving layer is a continuous layer on the inner sides of the side shield and on the leading shield, and the overlying FGL and non-spin preserving layers are conformally formed on the spin preserving layer. As a result, the flow of $I_a$, $I_b$, or $I_c$ from the leading shield toward the MP leading side, and from each side shield toward an adjacent MP side is generally orthogonal to an inner surface of each GML layer in the leading gap and side gaps, respectively.

A method of forming a GML stack is also provided. For example, according to the fifth embodiment, an opening is formed in the side shield layer on the leading shield to expose a portion of leading shield top surface. Thereafter, the spin preserving layer, FGL, and non-spin preserving layer are sequentially deposited in the opening to form conformal layers. Then, the main pole layer is deposited to fill the remainder of the opening. A planarization step may be used to form a trailing side on the MP that is coplanar with a top surface of the GML stack between each MP side and a side shield. A GML stack is preferably formed and patterned on the MP trailing side and side shield before a write gap is deposited, and a planarization process is used to yield a first flux guiding element with a thickness equal to that of the write gap on each side thereof. Thereafter, the trailing shield is deposited.

DETAILED DESCRIPTION

The present disclosure is a PMR writer structure wherein a flux guiding element is formed within one or more of a write gap, side gaps, and leading gap to increase reluctance between the MP and trailing shield, side shields, and leading shield, respectively, thereby forcing more magnetic flux from the MP tip at the ABS to enhance writability. Although the exemplary embodiments relate to a PMR writer where current is applied from the surrounding shields towards the MP, the present disclosure encompasses alternative embodiments (not shown) where the direction of the applied current is reversed. In the drawings, the y-axis is in a cross-track direction, the z-axis is in a down-track direction, and the x-axis is in a direction orthogonal to the ABS and towards a back end of the PMR writer. Thickness refers to a down-track distance, width is a cross-track distance, and height is a distance from the ABS in the x-axis direction. The terms magnetization and moment may be used interchangeably.

The term "behind" refers to an x-axis position of one structural feature with respect to another. For example, component B formed behind component or plane A means that B is at a greater height from the ABS than A. A "front side" of a layer is a side facing the ABS, and a backside or backend faces away from the ABS. The terms "above" and "below" when referring to a down-track (DT) position of a layer with respect to a plane means that a layer above the plane is a greater DT distance from a substrate on which the MP is formed than a layer below the plane.

Figure 1:
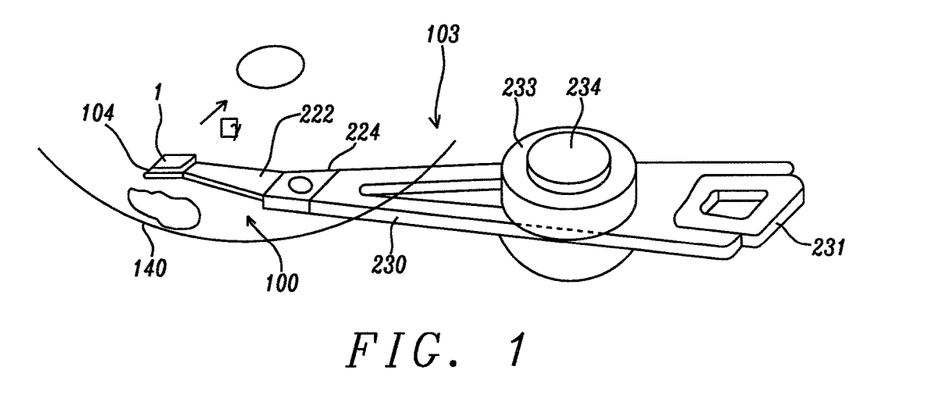
FIG. 1 is a perspective view of a head arm assembly of the present disclosure.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
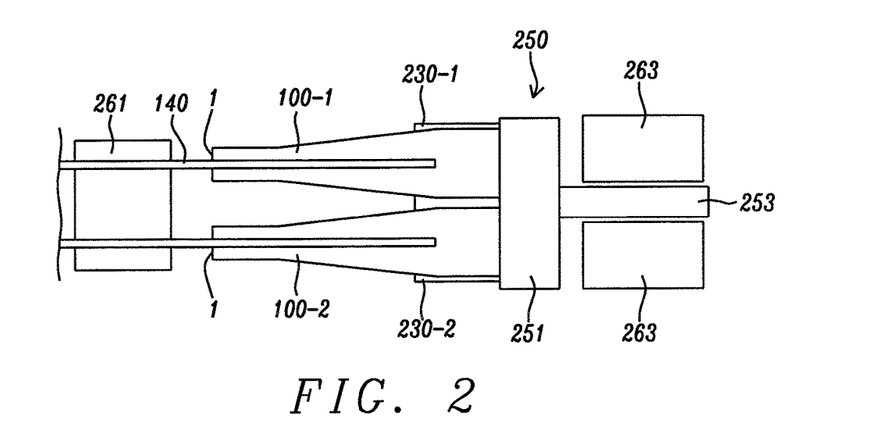
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
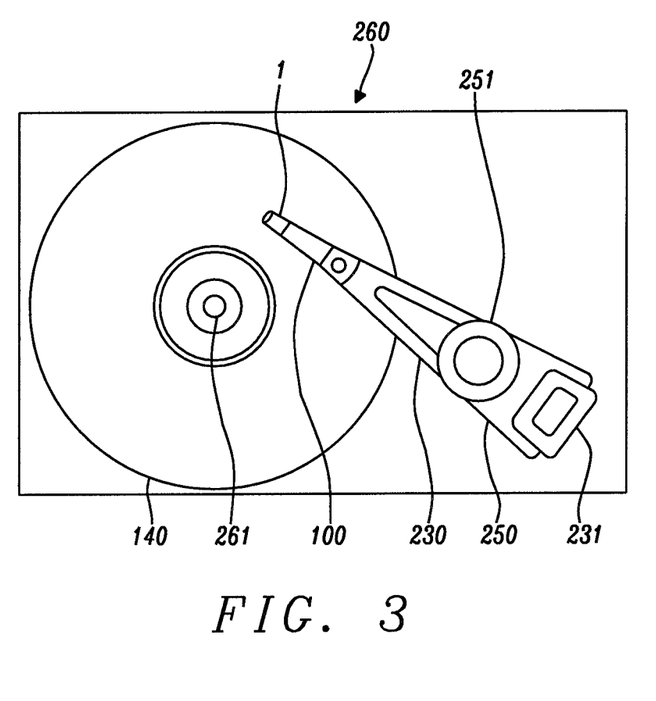
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
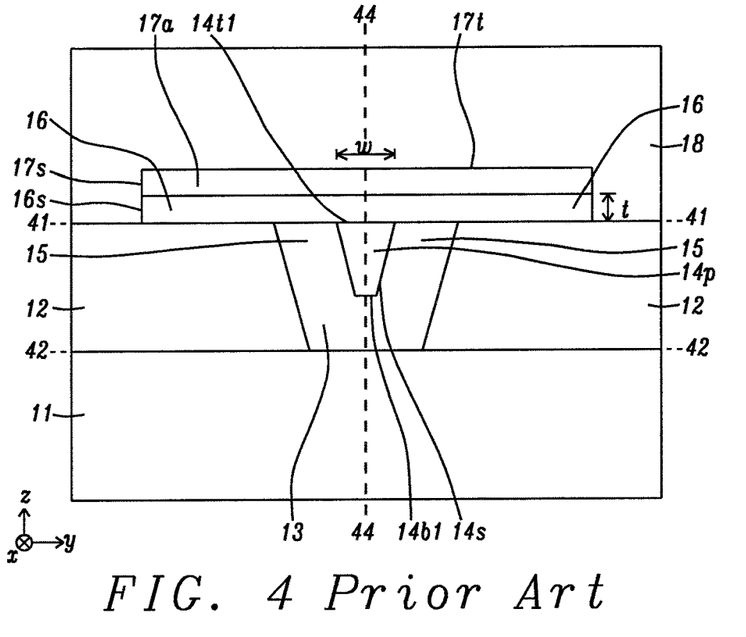
FIG. 4 is an ABS view of an all wrap around (AWA) shield structure surrounding a main pole according to a prior art design used by the inventors.

Referring to FIG. 4, a main pole (MP) with MP tip $14p$ having track width w, trailing side $14t1$, leading side $14b1$, and two sides $14s$ formed equidistant from a center plane 44-44 is shown with an all wrap around shield structure that was disclosed in related U.S. Patent application 2017/0133044. There is a write gap 16 with thickness t on the MP trailing side, side gaps 15 adjoining each MP side, and a leading gap 13 below the MP leading side. The trailing shield structure comprises a first trailing shield (TS) with a high magnetic saturation value from 19 kiloGauss (kG) to 24 kG, and with a front portion $17a$ on the write gap. The trailing shield structure also includes a second TS 18 formed on the first TS top surface $17t$ and sides $17s$, on write gap sides $16s$, and on a top surface of the side shields 12 at plane 41-41. Plane 41-41 includes the MP trailing side at the ABS. Side shields contact a top surface of the leading shield 11 at plane 42-42 that is parallel to plane 41-41 and includes the MP leading side at the ABS.

Figure 5:
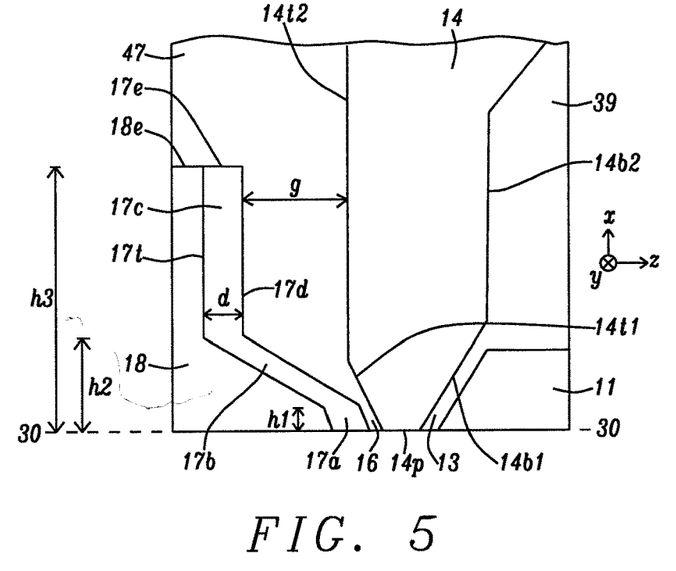
FIG. 5 is a down-track cross-sectional view showing a leading shield and a trailing shield structure on opposite sides of the main pole in the prior art design.

According to one embodiment of the present disclosure, the down track cross-sectional view at center plane 44-44 in FIG. 4 is illustrated in FIG. 5. MP leading side $14b1$ is tapered and connects with MP bottom surface $14b2$ that is aligned orthogonal to the ABS 30-30, and formed on dielectric layer 39. Moreover, a top surface of the leading shield 11 may be substantially parallel to the tapered MP leading side. The MP trailing side $14t1$ is also tapered and connects with MP top surface $14t2$ that is parallel to the MP bottom surface. Dielectric layer 47 fills a gap of down-track (DT) thickness g between a first TS back portion $17c$ at end $17e$ and a front side that adjoins first TS middle portion $17b$ at second height h2. The first TS shield may have a conformal thickness d in the front portion $17a$ between the ABS and first height h1, in the middle portion $17b$ from h1 to h2, and in the back portion $17c$ from h2 to back end $17e$ at h3. The second TS may also have a back end $18e$ at h3. It should be understood that other leading shield and trailing shield designs are compatible with the flux guiding element aspect of the present disclosure. Thus, the embodiments of the present disclosure are not limited to the surrounding shield designs including the leading shield, trailing shield, and side shields described herein.

Figure 6:
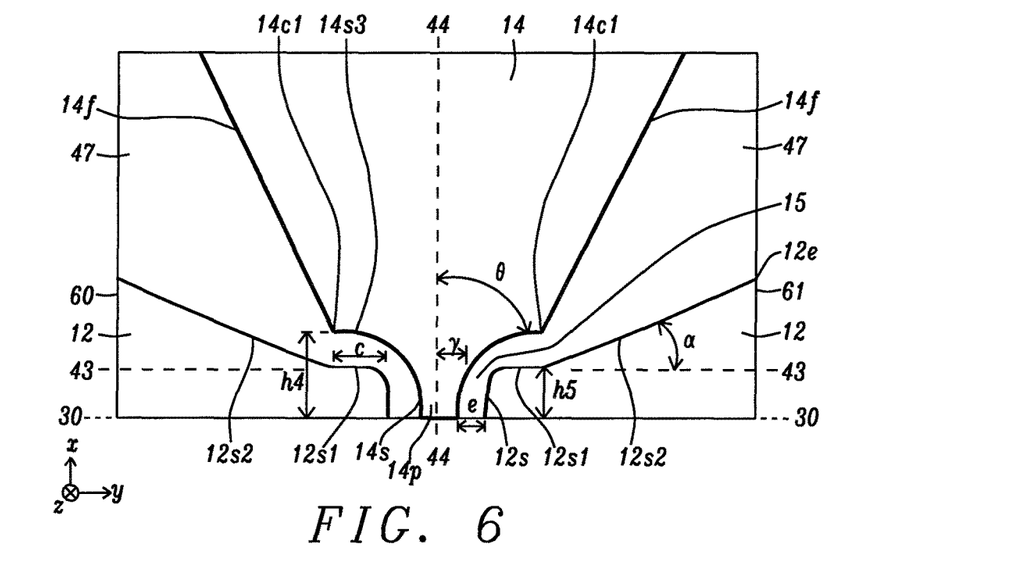
FIG. 6 is a top-down view where a side shield structure is formed on opposite sides of a main pole according to a prior art design.

One example of a side shield structure that is compatible with the flux guiding element of the present disclosure is depicted in the top-down view in FIG. 6, and was previously disclosed in related U.S. Pat. No. 9,406,317. In particular, MP 14 may have a curved side on each side of center plane 44-44 with an inner portion $14s$ proximate to the ABS 30-30, and an outer portion $14s3$ that ends at corner $14c1$ at height h4 where the curved side connects with MP flared side $14f$. Inner portion $14s$ and outer portion $14s3$ form an angle γ and θ, respectively, with respect to the center plane, where θ>γ. Meanwhile, each side shield 12 has a first side $12s$ formed substantially parallel to inner portion $14s$ and separated therefrom by side gap 15 having width e. A second side $12s1$ of each side shield has a width c at height h5 and is formed parallel to the ABS, and a third side $12s2$ extends from a far end of the second side to a far side 60 (or 61) of the side shield. The third side is formed at angle α with respect to plane 43-43 at height h5.

Figure 7:
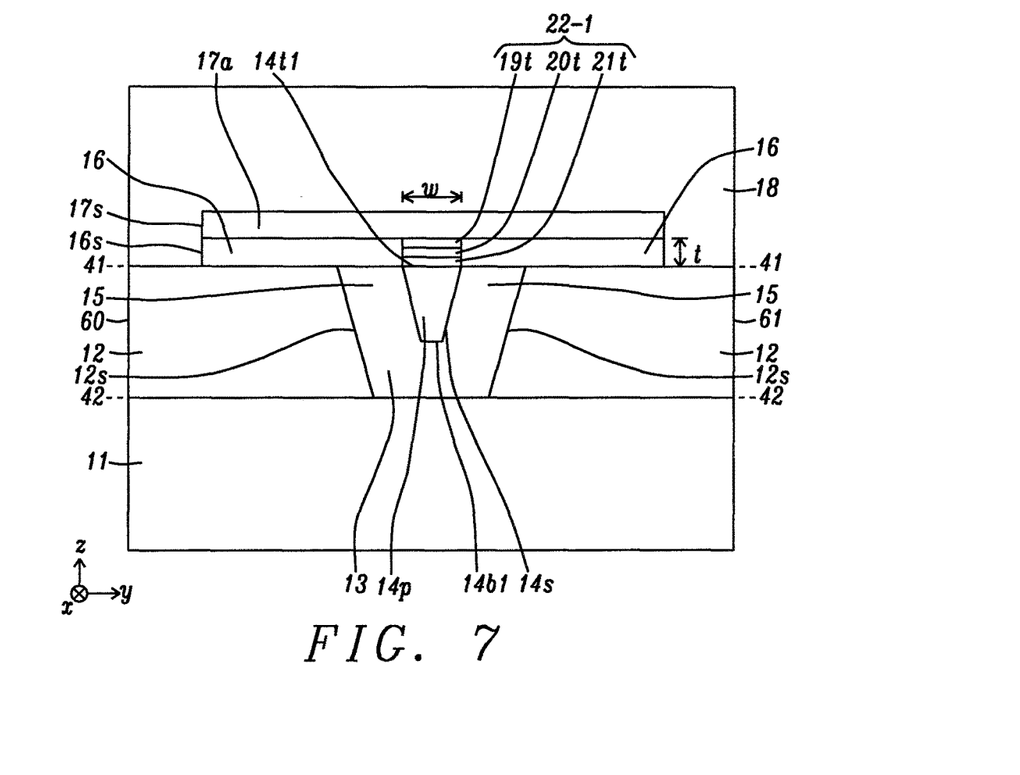
FIG. 7 is an ABS view according to a first embodiment of the present disclosure where a flux guiding layer (FGL) is formed within a write gap, and between a main pole (MP) trailing side and an overlying trailing shield.

Referring to FIG. 7, a first embodiment of the present disclosure is depicted and features a first flux guiding element 22-1 within write gap 16 and having a thickness t equal to the write gap thickness, and a width that is preferably equal to the track width w of the main pole trailing side 14t1 at the ABS. The patterned GML stack is also known as the first flux guiding element 22-1 and preferably extends about a throat height (TH) behind the ABS where TH (not shown) is proximate to plane 43-43 in FIG. 6. The first flux guiding element has a lower non-spin preserving layer 21t, middle FGL 20t, and upper spin preserving layer 19t that are sequentially formed on the MP trailing side 14t1.

In the exemplary embodiment, the thickness t is preferably from 5 nm to 30 nm. Non-spin preserving layer 21t is typically a metal such as Ta, W, Pt, Ru, Ti, Ir, Rh, or Pd. FGL 20t is a magnetic layer that is usually a multilayer structure comprised of one or more of $Ni_xFe_{100-x}$, $Co_yFe_{100-y}$, $Co_zNi_{100-z}$, or alloys thereof with one or more additional elements, and with a thickness from 4 nm to 30 nm, and where x, y, and z are from 0 to 100 atomic %. The one or more additional elements are selected from B, and metals that are Mo, W, Pt, Pd, or Cr, for example. Spin preserving layer 19t is a conductive layer and is preferably comprised of Cu, Ag, Au, Al, or Cr.

Figure 13:
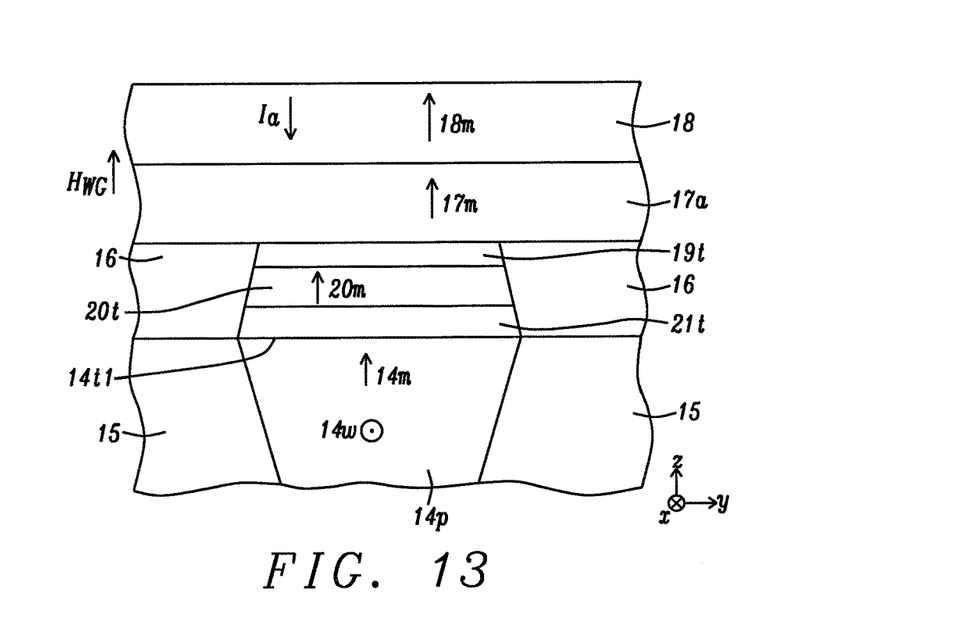
FIG. 13 is an ABS view of a FGL in the first embodiment wherein the FGL magnetization is oriented parallel to the gap field, and to magnetizations at a top surface of the main pole and within the overlying trailing shield structure.
Figure 14:
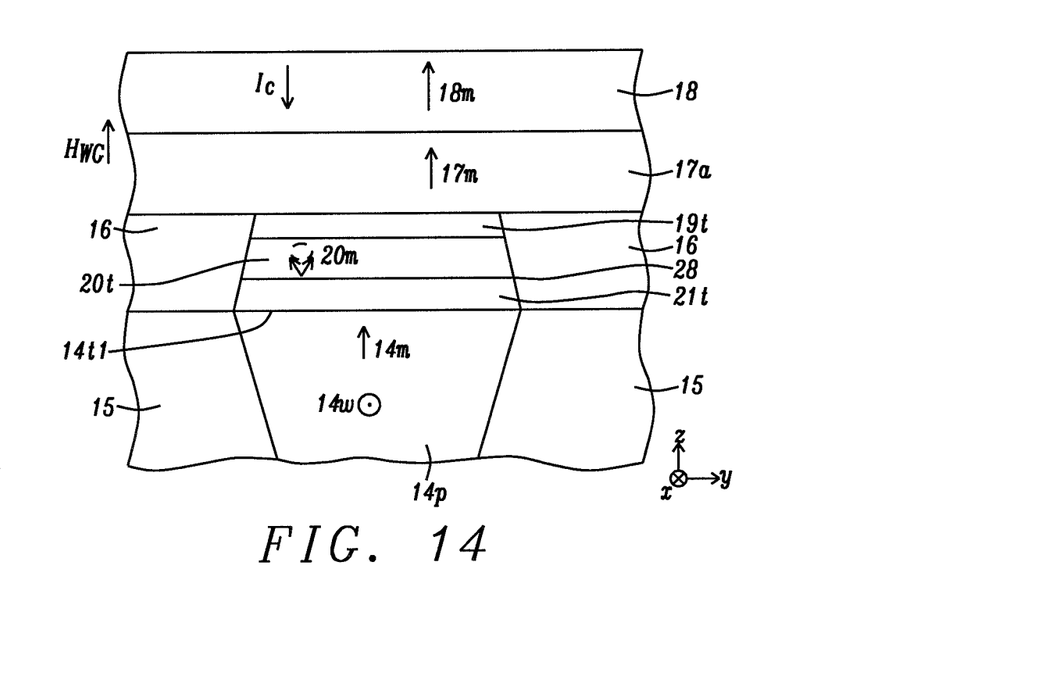
FIG. 14 is an ABS view of FIG. 13 wherein the applied current is a magnitude (critical current) that causes FGL magnetization to oscillate.
Figure 15:
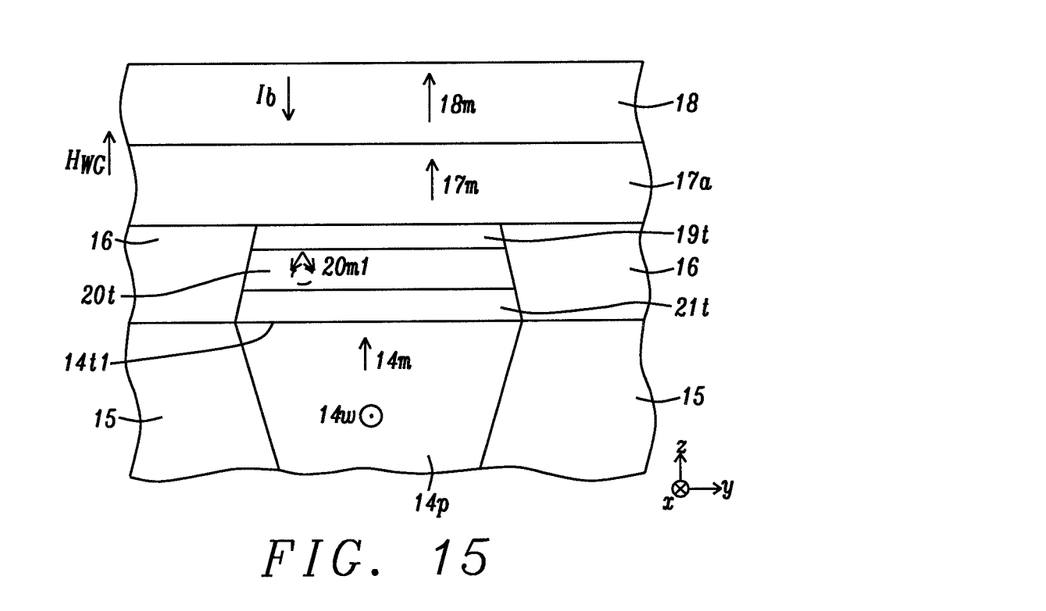
FIG. 15 is an ABS view of the FGL in FIG. 14 after a second current is applied with a magnitude sufficient to flip the FGL magnetization to a position opposite to the gap field according to an embodiment of the present disclosure.

A key feature of the FGL of the present disclosure is explained with regard to FIGS. 13-15 where the region in the PMR writer surrounding the GML stack in FIG. 7 is enlarged. In FIG. 13, FGL 20t has a moment 20m that is aligned parallel to the write gap field $H_{WG}$ and to MP magnetization 14m at trailing side 14t1, and parallel to first and second TS magnetizations 17m, 18m, respectively, when a first current $I_a$ is applied in a direction opposite to $H_{WG}$. The first current is low enough so as not to drive moment 20m into a precessional (oscillation) state.

As explained in related U.S. Pat. No. 8,582,240, FGL moment 20m is driven into an oscillation state indicated by the spinning arrow and dashed line in FIG. 14 when the current is increased above $I_a$ and reaches a critical current $I_c$. There are enough electrons in $I_c$ with magnetic moment parallel to magnetization 17m being extracted out of magnetization 20m while electrons with a moment anti-parallel to 17m are reflected back. When the critical current is maintained, the FGL has a stable oscillation wherein magnetization 20m departs from the parallel direction to magnetizations 14m, 17m, and 18m, and is useful in generating a radiofrequency field that assists the write process on a magnetic medium. Note that during a write process, magnetic flux 14w from MP tip 14p comes out of the plane of the drawing (at the ABS) and into a magnetic medium (not shown).

However, as shown in FIG. 15, when the applied current $I_b$ becomes sufficiently large, where $I_b > I_c$, the FGL moment 20m1 flips to a direction opposite to $H_{WG}$. In preferred embodiments, $I_b$ has a current density in a range of $1 \times 10^{-7}$ to $1 \times 10^{-9}$ Amp/cm$^2$. The mechanism is based on the behavior of electrons with spins parallel and anti-parallel to the moment in the trailing shields. The portion of electrons having a moment that is parallel to TS magnetization 17m, 18m are able to enter first TS 17a with very little resistance. However, electrons with a moment that is anti-parallel to TS magnetization do not enter the first TS shield easily because of less unoccupied states in the first TS, and are back scattered back to the FGL. As a result, a spin torque is exerted on FGL magnetization. Accordingly, the FGL moment is flipped and becomes magnetization 20m1, which is primarily oriented toward the MP trailing surface 14t1. Thus, there is a greater reluctance in the write gap, which means that $H_{WG}$ across write gap 16 is reduced and forces additional magnetic flux to surrounding areas, a portion of which will go parallel to magnetic flux 14w out of MP tip 14p at the ABS and into the magnetic recording medium. In some embodiments, the precessional cone angle (not shown) that indicates oscillation for magnetization 20m1 may be proximate to 0 degrees.

Figure 8:
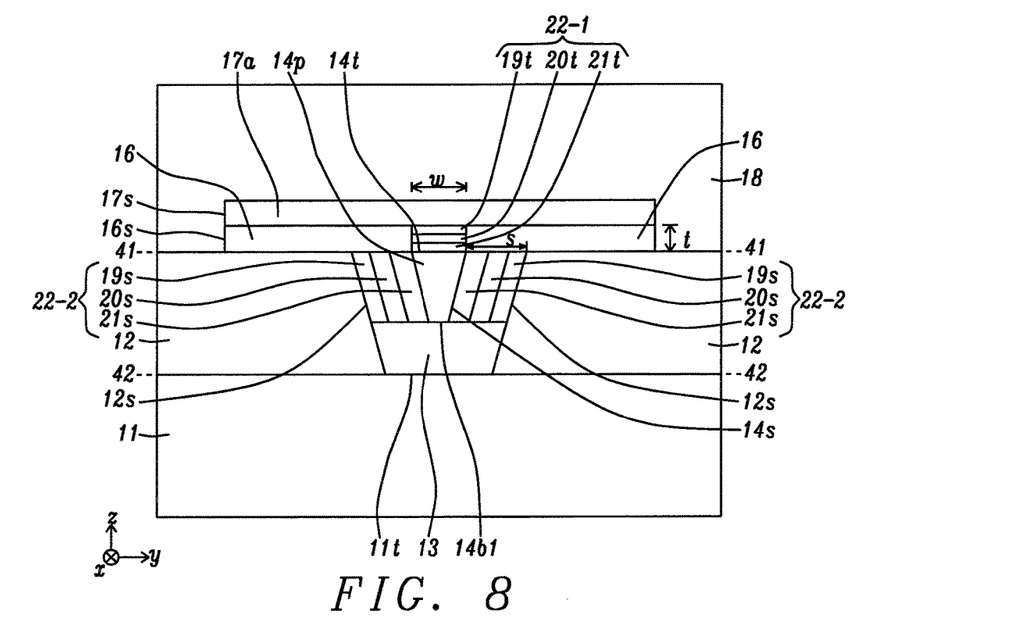
FIG. 8 is an ABS view according to a second embodiment of the present disclosure where a FGL is formed between the MP trailing side and trailing shield, and between each MP side and an adjacent side shield, but not in the leading gap.

Referring to FIG. 8, a second embodiment of the present disclosure is illustrated from an ABS view and features a second flux guiding element 22-2 comprised of non-spin preserving layer 21s, FGL 20s, and spin preserving layer 19s that replaces the side gap between each MP side 14s and an adjacent inner side 12s of side shield 12. Here, the second flux guiding element has a top end at plane 41-41 and a bottom end at a top surface of the leading gap, and does not extend down-track below the MP leading side 14b1. Layers 19s, 20s, 21s are conformally formed on each inner side 12s and may have the same composition as layers 19t, 20t, 21t, respectively, that were described previously. Total thickness of the second flux guiding element is shown as s and is 5 nm to 30 nm in some embodiments, but may be greater than t depending on cross-track width between MP side 14s and adjacent inner side 12s. Therefore, one or more of the second flux guiding element layers may have a greater thickness than the corresponding layer 19t, 20t, or 21t in the first flux guiding element. In some embodiments, the first flux guiding element may be omitted and replaced by a continuous write gap 16 when the second flux guiding elements are present.

Figure 9:
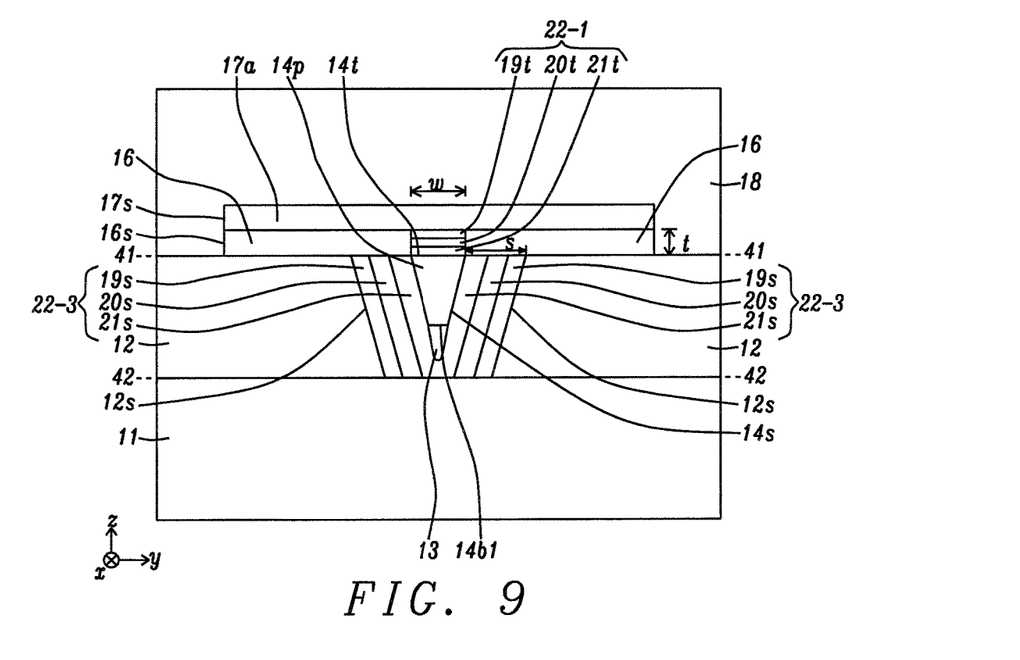
FIGS. 9-10 are ABS views according to embodiments of the present disclosure where a FGL is formed between the MP trailing side and trailing shield, and between each MP side and an adjacent side shield including within a leading gap.

Referring to FIG. 9, a third embodiment of a flux guiding element is depicted and represents a modification of the second embodiment. In particular, each of the layers 19s, 20s, 21s is extended downward to provide a conformal stack of layers on inner side 12s of side shield 12. A third flux guiding element 22-3 is formed on each side of MP tip 14p between a top end at plane 41-41 and a bottom end at plane 42-42. A portion of the leading gap 13 may remain below MP leading side 14b1, and is formed on non-spin preserving layer 21s. All aspects of the second embodiment relating to thickness and composition of layers 19s-21s are retained from the second embodiment. Again, the first flux guiding element 22-1 is optional, and may be omitted such that there is only a third flux guiding element 22-3 adjoining each MP side 14s.

Figure 10:
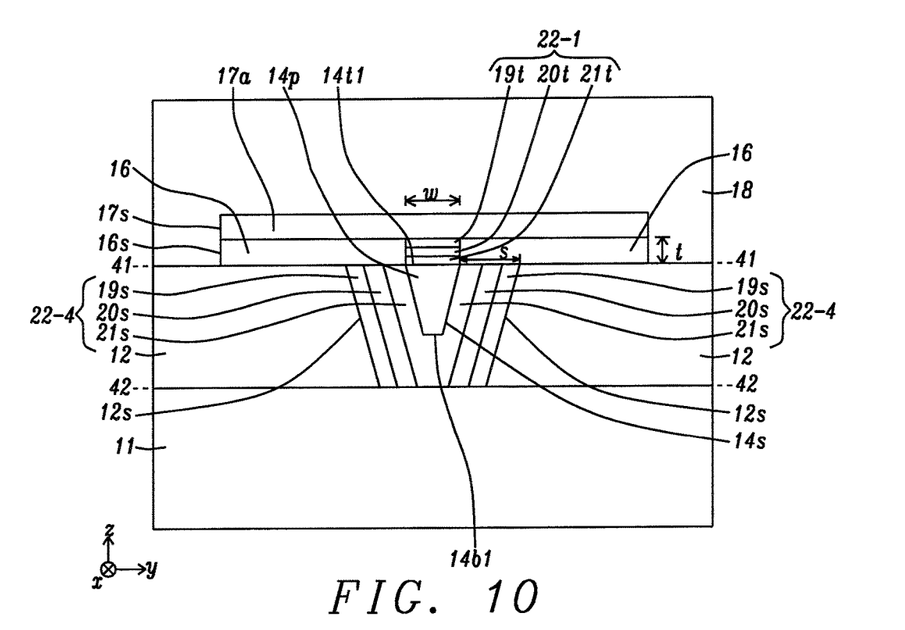

Referring to FIG. 10, the present disclosure also encompasses a fourth embodiment wherein the third flux guiding elements 22-3 in the third embodiment are replaced by fourth flux guiding elements 22-4 that completely replace each side gap and the leading gap. As a result, the portion of the leading gap below MP leading side 14b1 in FIG. 9 is filled with non-spin preserving layer 21s. FGL 20s and the non-spin preserving layer are conformally formed on the spin preserving layer 19s on each side shield inner side 12s. Thus, inner surfaces of the FGL and spin preserving layer are essentially parallel to the inner surface of the adjacent side shields on each side of the MP from plane 41-41 to plane 42-42.

Figure 11:
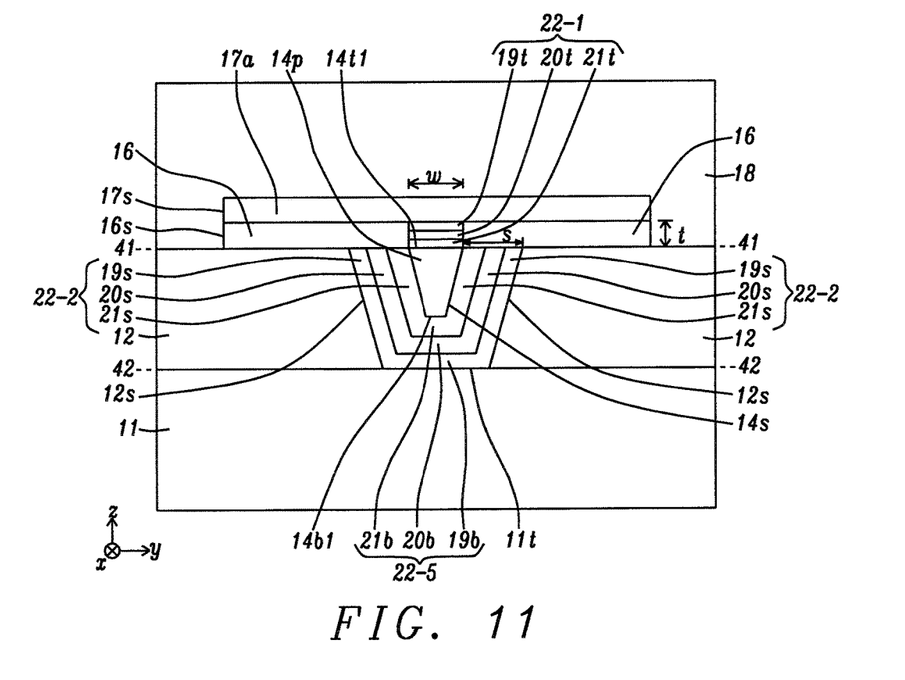
FIG. 11 is an ABS view according to an embodiment of the present disclosure wherein a FGL is formed between the MP trailing side and trailing shield, and a conformal FGL is formed within the side gap and leading gap areas.

The present disclosure anticipates a fifth embodiment shown in FIG. 11 where a fifth flux guiding element 22-5 is formed in the leading gap, and is comprised of layers 19b, 20b, and non-spin preserving layer 21b sequentially formed on a top surface of leading shield 11. The two flux guiding elements 22-2 and flux guiding element 22-5 form a continuous stack of layers around the MP leading side 14b1 and MP sides 14s. In other words, non-spin preserving layers 19s, 19b form a continuous layer that is conformally disposed on inner sides 12s, and the leading shield top surface 11t, respectively. Likewise, FGL 20s and FGL 20b form a continuous layer on layers 19s, 19b, respectively, and spin preserving layers 21s, 21b form a continuous layer on FGL 20s and FGL 20b, respectively.

Figure 12:
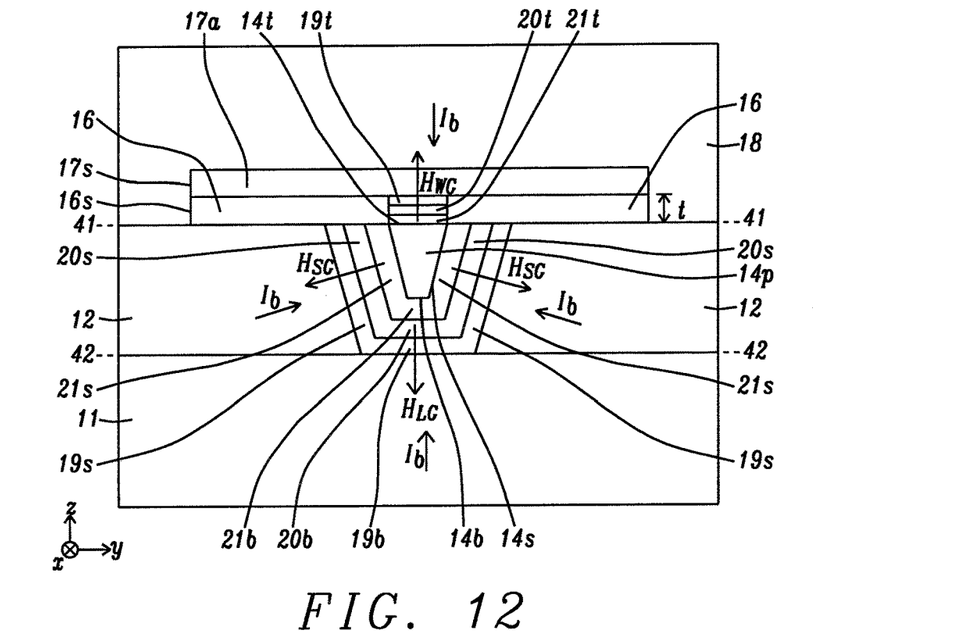
FIG. 12 is an ABS view of the FGL embodiment in FIG. 11 and depicts multi-directional gap fields ($H_{WG}$, $H_{SG}$, $H_{LG}$), and a first current oriented in an opposite direction to gap fields on each side of the main pole proximate to the ABS.

Each flux guiding element described herein provides the same benefit of reducing one of the gap fields $H_{WG}$, $H_{SG}$, and $H_{LG}$ between MP tip 14p and an adjacent shield structure. As shown in FIG. 12 where a flux guiding element is formed in each of the gaps around the MP tip 14p according to the fifth embodiment, a current $I_b$ of sufficient magnitude may be applied opposite to the gap field emanating from each of the MP sides 14s, trailing side 14t1, and leading side 14b1. Note that each gap field $H_{WG}$, $H_{SG}$, and $H_{LG}$, and applied current are generally oriented orthogonal to each MP tip sides 14t1, 14s, and 14b1, respectively. In each of FGL 20t, FGL 20s, and FGL 20b, the moment (not shown) flips from a direction parallel to the gap field to a direction that is anti-parallel to the gap field when current $I_b$ has sufficient magnitude as described previously with respect to FIG. 15. As a result, reluctance is increased between MP trailing side 14t1 and first TS shield 17a, and also between MP side 14s and adjacent side shield 12, and between MP leading side 14b1 and leading shield 11, which enhances magnetic flux (not shown) from the MP tip at the ABS and into a magnetic recording medium during a write process.

In order for the flux guiding elements to have acceptable reliability, the magnitude of current $I_b$ must be maintained as low as possible, but greater than critical current $I_c$, since excessive current may cause degradation of one or more layers in the flux guiding elements due to electromigration and/or excessive local heating. In each embodiment described herein, the flux guiding element extends to a height from the ABS that is about the throat height of the respective shield. A smaller height could also be used in cases when the throat height of the shield is larger than 50 nm. It should be understood that the electrical current direction required for the flux guiding elements to perform as designed is from shields→spin preserving layer→FGL→non-spin preserving layer→MP. In other words, the current $I_b$ direction is independent of the gap field direction. In fact, the current direction stays the same when the gap field is switched to the opposite direction in order to write a transition.

Figure 16:
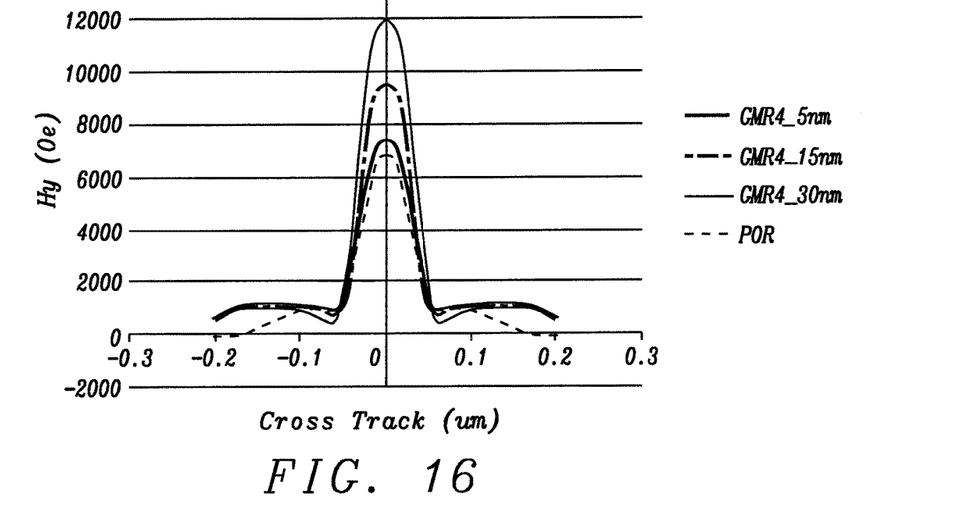
FIG. 16 is a plot of Hy field vs. cross-track position for a PMR writer comprised of GML stacks with various FGL (24 kG material) thicknesses according to the fifth embodiment compared with a prior art scheme without a GML stack.

We have demonstrated the benefits of the flux guiding element of the present disclosure by performing a finite element modeling (FEM) simulation where cross-track profiles of the magnetic field (Hy field) of the fifth embodiment are compared with a process of record (POR) design shown in FIG. 4. The Hy field is the component normal to ABS as observed at a media position 15 nm away from the MP. Here the FGLs (20b, 20s) in FIG. 11 are assigned a Ms value of 24 kG, and flux guiding element 22-1 is omitted. Three thicknesses s of 5 nm, 15 nm, and 30 nm were evaluated for the flux guiding elements 22-2 and 22-5. As illustrated in FIG. 16, we find the Hy field improves significantly for a PMR writer that comprises a flux guiding element in both side gaps and the lead gap according to an embodiment described herein.

The present disclosure also encompasses a method of fabricating a flux guiding element between the MP and one or more of the trailing shield, side shields, and leading shield at the ABS. From a perspective at the eventual ABS in FIG. 17, leading shield layer 11 comprised of 10-16 kG material is provided as a starting point. Side shield layer 12 is plated by a conventional method and an opening 55 is formed therein to expose a portion of leading shield top surface 11t. Sides 12s on the side shields are equidistant from center plane 44-44 that bisects the opening.

Figure 17:
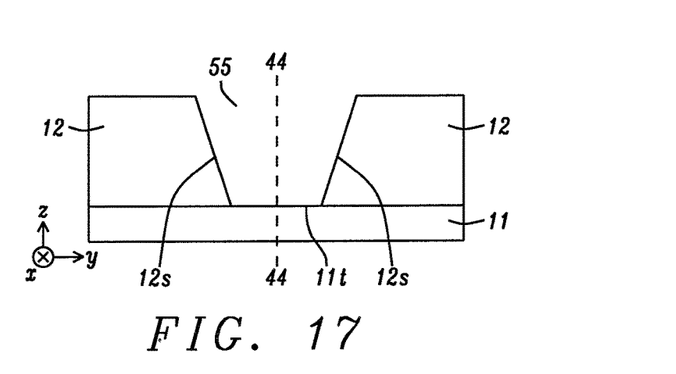
FIG. 17 is an ABS view of a step in fabricating a flux guiding element according to an embodiment of the present disclosure wherein an opening is formed within a side shield layer and exposes a top surface of the leading shield.
Figure 18:
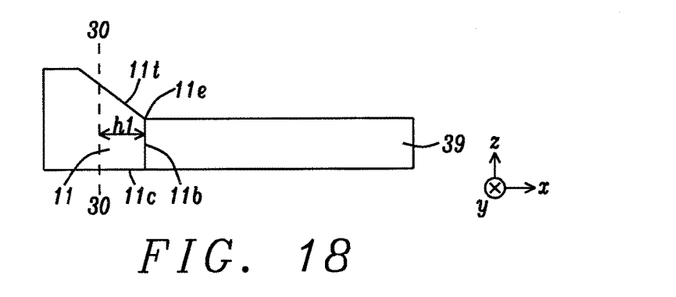
FIG. 18 is a down-track cross-sectional view of the leading shield in FIG. 17 after a taper is formed on the exposed portion of leading shield top surface.
Figure 19:
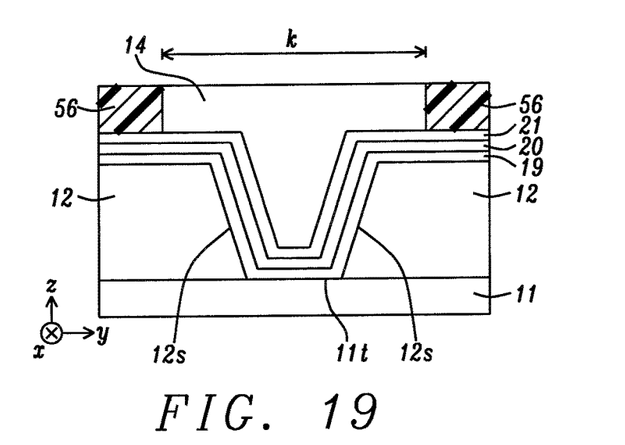
FIG. 19 is an ABS view of the intermediate structure in FIG. 18 after a GMR stack of layers and a main pole layer are sequentially depositing in the opening.

FIG. 18 is a down-track cross-sectional view along plane 44-44 in FIG. 17 and shows the eventual ABS (plane 30-30) that is determined after a lapping process at the end of the PMR writer fabrication sequence. A photoresist patterning and etching sequence as described in related U.S. Pat. No. 8,749,919 may be used to form a leading shield tapered top surface 11t that intersects the eventual ABS and terminates at a back end 11e at back side 11b which is a first height h1 from plane 30-30. The top surface 11t at plane 30-30 is a greater down-track distance than the back end from the leading shield bottom surface 11c Thereafter, in FIG. 19, non-spin preserving layer 19, FGL 20, and spin preserving layer 21 are sequentially deposited on sides 12s and leading shield top surface 11t. A physical vapor deposition (PVD) method may be employed to provide conformal layers. Next, a photoresist layer 56 is coated and patterned to form an opening having a cross-track width k that exposes the spin preserving layer 21 within partially filled opening 55. Then the main pole layer 14 is plated using a conventional method to fill the photoresist opening and also opening 55.

Figure 20:
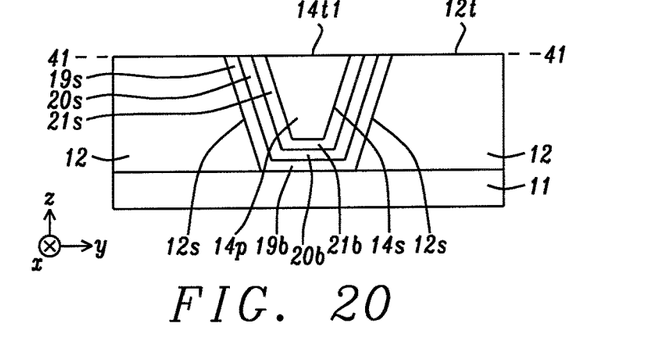
FIG. 20 is an ABS view of the intermediate structure in FIG. 19 after a chemical mechanical polish (CMP) process is performed to planarize a top surface thereof.

In FIG. 20, a chemical mechanical polish (CMP) process is employed to remove top portions of the main pole layer and the portions of layers 19-21 above side shield top surface 12t after the photoresist layer is removed by a chemical solution. Accordingly, top surface 12t of side shield layers 12 becomes coplanar with a top surface of main pole trailing side 14t1 at plane 41-41. A conventional ion beam etch (IBE) process involving a photoresist masking layer may be used at this point to form a tapered top surface on the MP and surrounding shields. Note that a flux guiding element comprised of non-spin preserving layer 19s, FGL 20s, and spin preserving layer 21s is now formed on each MP side 14s, and another flux guiding element comprised of non-spin preserving layer 19b, FGL 20b, and spin preserving layer 21b is formed on leading shield top surface 11t.

Figure 21:
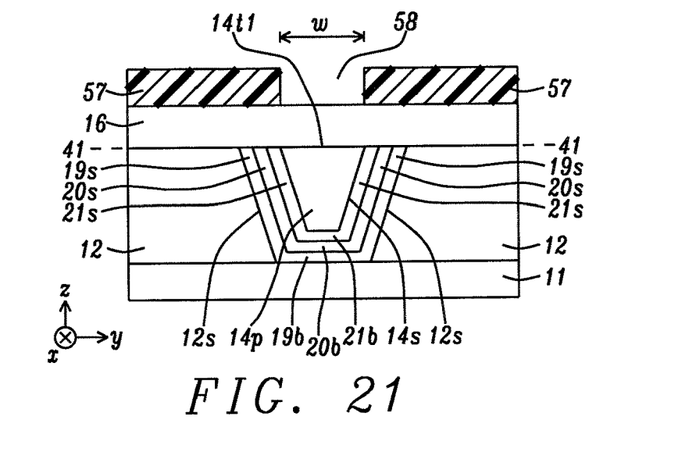
FIG. 21 is an ABS view of the intermediate structure in FIG. 20 after a write gap is deposited and a photoresist layer is patterned on the write gap.

According to one embodiment shown in FIG. 21, the write gap 16, which is comprised of alumina, silica, or another dielectric material, is deposited on side shields 12 and MP trailing side 14t1 with a method such as PVD. A photoresist layer 57 is coated on the write gap and then patterned with a conventional method to give an opening 58 of track width w that exposes a portion of the write gap above MP trailing side 14t1.

Figure 22:
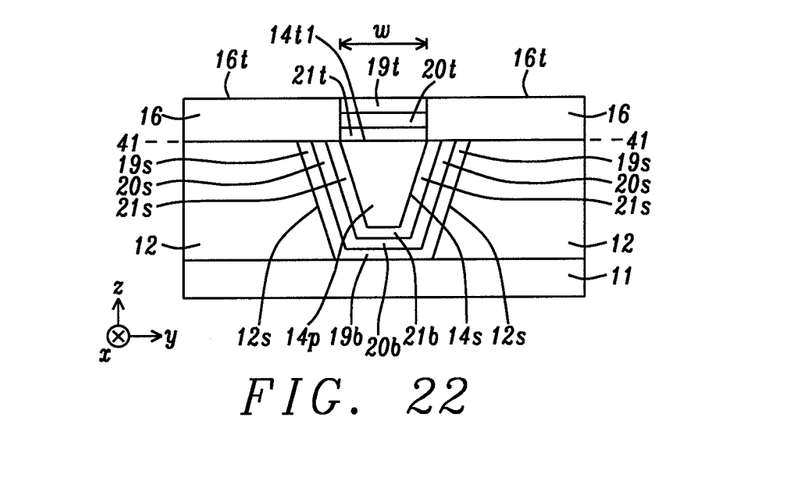
FIG. 22 is an ABS view of the intermediate structure in FIG. 21 after the opening in the photoresist pattern is etch transferred through the write gap, and a GML stack of layers is then deposited to fill the opening in the write gap.
Figure 23:
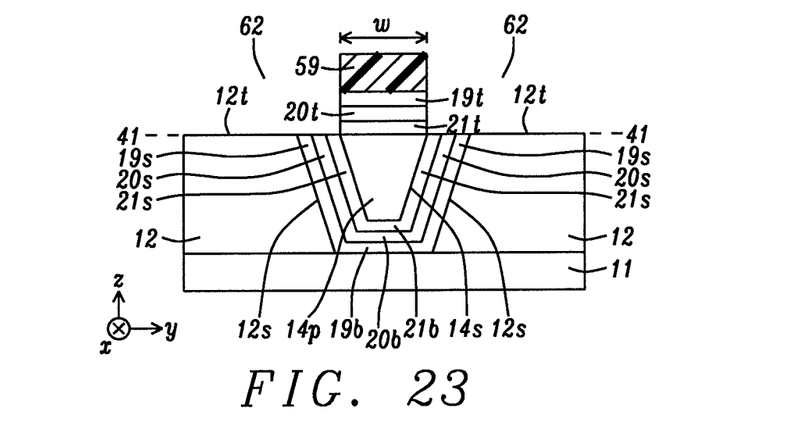
FIG. 23 is an ABS view of the intermediate structure in FIG. 20 after a GML stack is deposited on the write gap and patterned to form a flux guiding element.

According to a preferred embodiment depicted in FIG. 23, the process flow continues from the intermediate structure in FIG. 20 by depositing a full film GML stack of layers comprised of lower spin preserving layer 21, middle FGL 20, and upper non-spin preserving layer 21 on side shields 12 and the MP trailing side 14t1. A photoresist layer 59 is coated on the GML stack and is patterned to yield a width w, and openings 62 on each side of the photoresist layer that expose side shield top surface 12t and form the first flux guiding element with the 21t/20t/19t stack. Thereafter, as shown in FIG. 22, the write gap 16 is deposited and a CMP process is performed to remove the photoresist layer and form a planar write gap top surface 16t on each side of the first flux guiding element.

Referring to FIG. 22, the alternative process flow continues from FIG. 21 where opening 58 is filled by sequentially depositing non-spin preserving layer 19t, FGL 20t, and spin preserving layer 21t to yield another flux guiding element. A planarization step such as a second CMP process may be performed to remove the photoresist layer, and provide a top surface of layer 21t that is coplanar with write gap top surface 16t. Thereafter, a conventional sequence of steps is followed to deposit the first TS layer, form sides 16s, 17s on the write gap and first TS layer, respectively, and then deposit the second TS layer 18 described previously with respect to FIG. 11. In a subsequent series of steps, an upper portion of the PMR writer structure is fabricated and a lapping process is performed to generate an ABS. A complete sequence of steps that may be used to form a PMR writer structure is described in detail in related U.S. Pat. No. 8,749,919.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
   (a) a main pole with a leading side and a trailing side, the leading side adjoins a leading gap at an air bearing surface (ABS), and the trailing side has a track width and adjoins a write gap at the ABS, and is formed on a first plane that is orthogonal to the ABS;
   (b) a side gap which contacts a side of the main pole formed between the trailing side and leading side on each side of a center plane that bisects the main pole in a direction orthogonal to the ABS and the first plane;
   (c) the leading gap that adjoins a bottom portion of each side gap and contacts the leading side of the main pole;
   (d) a shield structure comprising a first trailing shield (TS) on the write gap, a side shield contacting each side gap, and a leading shield adjoining a bottom surface of the leading gap at a second plane that is parallel to the first plane; and
   (e) at least one flux guiding element that is formed in one of the write gap, side gaps, or leading gap; and wherein the at least one flux guiding element extends to a height that is about a throat height of the first TS, and comprises:
      (1) an inner non-spin preserving layer that contacts the main pole;
      (2) a middle flux guiding layer (FGL) having a magnetization aligned parallel to a gap field from the main pole during a write process, and wherein the PMR writer is configured so that the FGL magnetization flips to an opposite direction when a current $I_b$ of sufficient magnitude is applied in a direction from the shield structure towards the main pole; and
      (3) an outer spin preserving layer that adjoins one of the first TS, side shields, and leading shield.

2. The PMR writer of claim 1 wherein the at least one flux guiding element is formed in the write gap, and has a thickness equal to a write gap thickness, and a width essentially equal to the track width.

3. The PMR writer of claim 2 wherein a second flux guiding element is formed in each side gap between the first plane and the leading gap.

4. The PMR writer of claim 2 wherein a second flux guiding element is formed in each side gap and extends from a top end at the first plane to a bottom end at the second plane such that only a portion of the leading gap remains below the main pole leading side.

5. The PMR writer of claim 2 wherein a second flux guiding element is formed in each side gap and extends from a top end at the first plane to a bottom end at the second plane and fills each side gap and the leading gap.

6. The PMR writer of claim 2 wherein a second flux guiding element is formed in each side gap, and a third flux guiding element is formed in the leading gap, and wherein spin preserving layers in the second and third flux guiding elements form a conformal spin preserving layer (SPL) on the side shields, and leading shield, respectively, and wherein FGL in the second and third flux guiding elements form a conformal FGL on the conformal SPL, and non-SPL in the second and third flux guiding elements form a conformal non-SPL on the conformal FGL.

7. The PMR writer of claim 1 wherein the at least one flux guiding element has a thickness from about 5 nm to 30 nm.

8. The PMR writer of claim 1 wherein the non-spin preserving layer is a dielectric layer that is one of Ta, W, Pt, Ru, Ti, Ir, Rh, or Pd.

9. The PMR writer of claim 1 wherein the FGL is comprised of a multilayer of magnetic materials that is one or more of $Ni_xFe_{100-x}$, $Co_yFe_{100-y}$, $Co_zNi_{100-z}$, or alloys thereof with one or more additional elements that are B, Mo, Pt, Pd, W, and Cr where each of x, y, and z are from 0 to 100 atomic %.

10. The PMR writer of claim 1 wherein the spin preserving layer is a conductive layer that is one of Cu, Ag, Au, Al, or Cr.

11. The PMR writer of claim 1 wherein the magnitude of $I_b$ is greater than a critical current $I_c$, where $I_c$ drives the FGL magnetization into an oscillatory state while maintaining the FGL magnetization substantially in the direction of the gap field.

12. The PMR writer of claim 1 wherein $I_b$ has a current density that is in a range of $1 \times 10^{-7}$ Amp/cm$^2$ to $1 \times 10^{-9}$ Amp/cm$^2$.

13. A head gimbal assembly (HGA), comprising:
   (a) a slider on which the PMR writer of claim 1 is formed; and
   (b) a suspension that has a flexure to which the slider is joined, a load beam with one end connected to the flexure, and a base plate connected to the other end of the load beam.

14. A magnetic recording apparatus, comprising:
   (a) the HGA of claim 13;
   (b) a magnetic recording medium positioned opposite to the slider;
   (c) a spindle motor that rotates and drives the magnetic recording medium; and
   (d) a device that supports the slider, and that positions the slider relative to the magnetic recording medium.

15. A method of forming a perpendicular magnetic recording (PMR) writer wherein at least one of the gaps surrounding a main pole has a flux guiding element therein, comprising:
   (a) providing a shield structure comprised of a leading shield and a side shield layer on the leading shield wherein the side shield layer has an opening bounded by two inner sides of the side shield layer and a portion of the leading shield top surface, and the two inner sides are equidistant from a center plane;
   (b) depositing a conformal first flux guiding element on the two inner sides and the portion of leading shield top surface, and wherein the conformal first flux guiding element comprises:
      (1) a lower first spin preserving layer;
      (2) a middle first flux guiding layer (FGL); and
      (3) an upper first non-spin preserving layer wherein the conformal first flux guiding element is configured so that a magnetization in the middle first FGL flips to a direction antiparallel to a side gap field ($H_{SG}$) and to a leading gap field ($H_{LG}$) when a current $I_b$ of sufficient magnitude is applied in a direction from each side shield layer and the leading shield towards the main pole;

(c) depositing the main pole (MP) having two sides and a bottom surface (leading side) on the upper first non-spin preserving layer; and (d) performing a first chemical mechanical polish (CMP) process to form a top surface on the main pole that is coplanar with a top surface of the side shield layer on each side of the center plane.

16. The method of claim 15 further comprising:

(a) providing a tapered top surface on the main pole with a process comprised of an ion beam etch and a photoresist masking layer;

(b) depositing a gap magnetic layer (GML) stack of layers on the tapered MP top surface and on each side shield layer top surface wherein the GML stack comprises:
    (1) a lower second non-spin preserving layer;
    (2) a middle second flux guiding layer (FGL); and
    (3) an upper second spin preserving layer;

(c) patterning the GML stack such that a portion thereof is retained on the MP top surface thereby forming a second flux guiding element having sides at the air bearing surface plane that are separated by a cross-track dimension essentially equal to a track width, and that is configured so that a magnetization in the middle second FGL flips to a direction antiparallel to a write gap field ($H_{WG}$) when a current $I_b$ of sufficient magnitude is applied in a direction from a trailing shield towards the main pole;

(d) depositing a write gap that adjoins the sides of the second flux guiding element; and (e) performing a second CMP process such that the write gap has a thickness equal to that of the second flux guiding element.

17. The method of claim 16 wherein each of the conformal first flux guiding element and second flux guiding element has a thickness from 5 nm to 30 nm.

18. The method of claim 16 wherein the upper first non-spin preserving layer and lower second non-spin preserving layer are comprised of Ta, W, Pt, Ru, Rh, Ir, Rh, or Pd.

19. The method of claim 16 wherein the middle first FGL and middle second FGL are comprised of a multilayer of magnetic materials that is one or more of $Ni_xFe_{100-x}$, $Co_yFe_{100-y}$, $Co_zNi_{100-z}$, or alloys thereof with one or more additional elements that are B, Mo, Pt, Pd, W, and Cr where each of x, y, and z are from 0 to 100 atomic %.

20. The method of claim 16 wherein the lower first spin preserving layer and upper second spin preserving layer are one of Cu, Ag, Au, Cr, and Al.

21. The method of claim 16 wherein the magnitude of $I_b$ is greater than a critical current $I_c$, where $I_c$ drives each of the middle first FGL magnetization and middle second FGL magnetization into an oscillation state while maintaining a direction substantially in the direction of the gap fields from the main pole sides and leading side, and from the main pole trailing side, respectively.

22. The method of claim 16 wherein $I_b$ has a current density that is in a range of $1\times10^{-7}$ Amp/cm$^2$ to $1\times10^{-9}$ Amp/cm$^2$.

23. The method of claim 16 further comprised of forming a trailing shield on the write gap and on the second flux guiding element such that a magnetization in the second FGL flips to a direction antiparallel to a write gap field ($H_{WG}$) when a current $I_b$ of sufficient magnitude is applied in a direction from the trailing shield towards the main pole.

* * * * *